Figure 1:
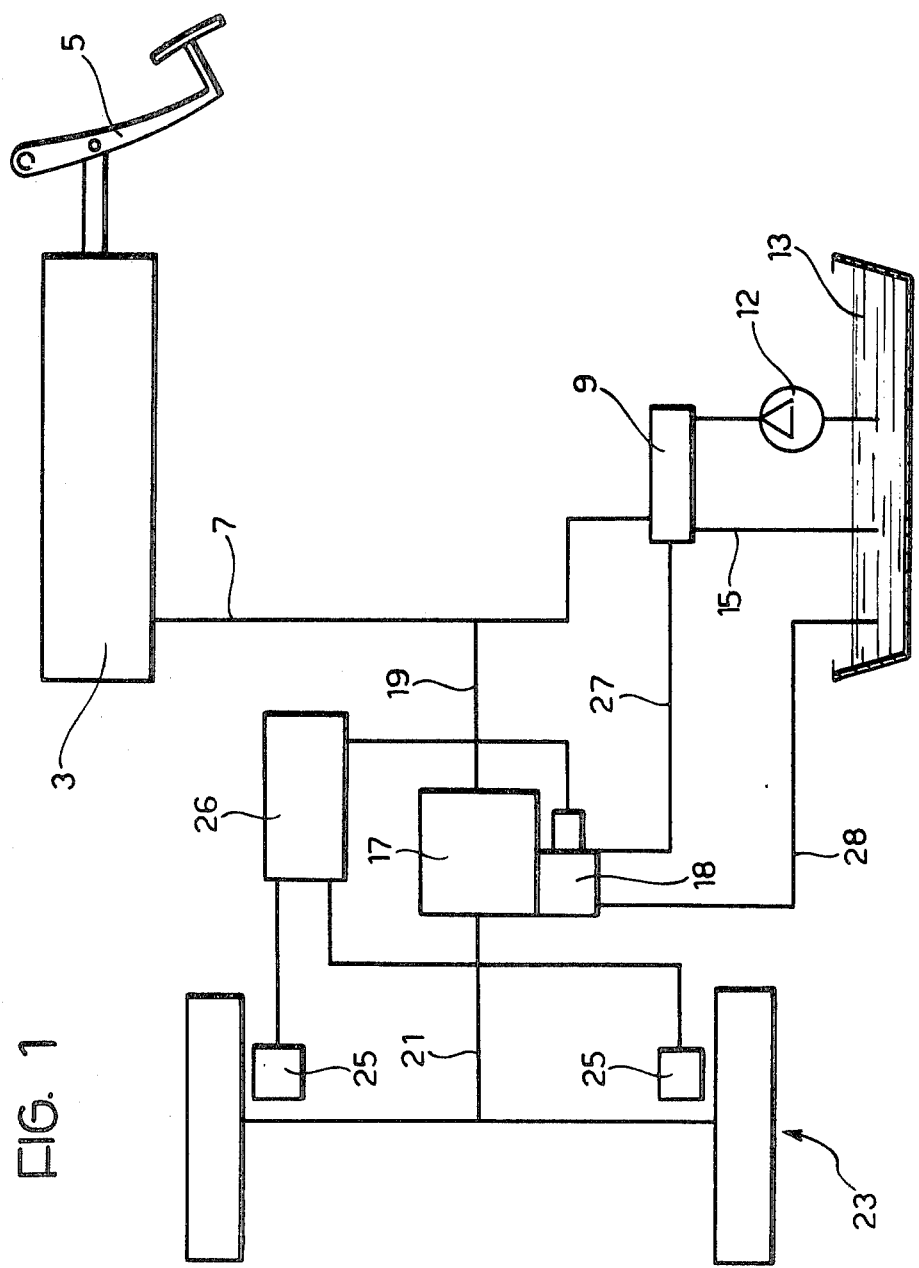

United States Patent [19]
Vannini et al.

[11] 4,181,373
[45] Jan. 1, 1980

[54] HYDRAULIC ACTUATOR FOR A MOTOR VEHICLE ANTI-SKID BRAKING SYSTEM

[75] Inventors: Paolo Vannini, Cambiano; Enrico Rivetti, Turin; Antonino Bertone, Sant Antonino, all of Italy

[73] Assignee: Fiat Societa per Azioni, Turin, Italy

[21] Appl. No.: 938,148

[22] Filed: Aug. 30, 1978

[30] Foreign Application Priority Data
Sep. 12, 1977 [IT] Italy .................. 69013 A/77

[51] Int. Cl.² .................. B60T 8/04; B60T 13/68
[52] U.S. Cl. .................. 303/116; 303/119
[58] Field of Search .............. 303/119, 113, 115, 116, 303/117, 118

[56] References Cited
U.S. PATENT DOCUMENTS
4,033,638  7/1977  Bertone .................. 303/116

Primary Examiner—Reinhard J. Eisenzopf
Attorney, Agent, or Firm—Sughrue, Rothwell, Mion, Zinn and Macpeak

[57] ABSTRACT

A hydraulic actuator for a motor vehicle anti-skid braking system, in which the static and dynamic parts of the hydraulic circuit are separated, the actuator having a solenoid valve operated by electrical signals generated by sensors when associated wheels of the vehicle reach an incipient skid state; upon operation of the solenoid valve during braking, pressure to one side of a balanced piston is removed so that it moves to close a valve which cuts off braking pressure to the brakes. A throttle passage allows pressure build up to take place until equilibrium is established across said balanced piston allowing braking to recommence after a time delay.

5 Claims, 2 Drawing Figures

HYDRAULIC ACTUATOR FOR A MOTOR VEHICLE ANTI-SKID BRAKING SYSTEM

The present invention relates to a hydraulic actuator, having an expansion chamber, for use in an anti-skid hydraulic braking system for a motor vehicle.

Devices of this general type are currently used in some braking systems for motor vehicles, for the purpose of optimising the pressure delivered to the brake cylinders as a function of the adhesion of the wheel itself to the surface over which the vehicle is passing.

A prior art actuator of this general type is described in U.S. Pat. No. 3,792,909 granted on Feb. 19, 1974. The actuator described in that specification has an inlet port for connection to a source of fluid under pressure, an outlet port for connection to a wheel brake, a discharge portion for connection to a fluid reservoir and a control input for connection to an anti-skid control device which operates to energise the control input of the actuator when a wheel which is being braked is in an incipient skid state. The known actuator includes a piston which is urged by a calibrated spring to a first position and which is movable to a second position under a pressure which is greater than the threshold rating of the spring; a chamber communicating with the discharge port; a shut-off device which is biased to close communication between this chamber and the discharge port by a spring, and which is kept in an open position by the piston in its first position; first valve means which are controlled by a solenoid connected to the control input and which are readapted to put the inlet port normally in communication with the outlet port and with the piston and to interrupt the said communication and provide for communication between the outlet port and the said chamber upon the energisation of the solenoid; an expansion device which is in direct communication with the chamber, and in throttled communication with the discharge port; and second valve means controlled by a solenoid connected to the control input, the second valve means providing, normally, for direct communication between the said chamber and the discharge port and which is adapted to close when the solenoid is energised.

A device of this type is however, fairly complicated, employing a large number of components and moreover having limited reliability since the dynamic part of the hydraulic circuit and the static part of the hydraulic circuit are not separated from each other.

The technical problem which the present invention seeks to solve is therefore that of providing a hydraulic actuator for an anti-skid hydraulic braking system which is an improvement over the known actuator described above, and in which the dynamic and static parts of the hydraulic circuit are separated from one another.

According to the present invention there is provided an anti-skid hydraulic actuator for a motor vehicle hydraulic braking circuit comprising a master cylinder, a reservoir for brake fluid, a volumetric pump, a pressure modulating valve, an electronic circuit with sensors sensitive to the dynamic state of the wheels and operable to produce an output signal when an incipient skid state is detected, and brake cylinders of the wheels, characterised in that the said actuator includes, a three-way two-position hydraulic valve which is normally open at one end to connect a delivery conduit for brake fluid from the master cylinder to the brake cylinders and which is operated by a double-acting piston which is slidably sealed in a chamber which it separates into two parts, one part of which is connected to a conduit for delivery of brake fluid from the pressure modulating valve; an expansion chamber separated into two parts by a piston slidably sealed therein, one part of the said expansion chamber being connected to the other part of the chamber housing the said double-acting piston and the other part of the expansion chamber being connected by an internal passage to the other end of the three-way two-position hydraulic valve and to a unidirectional valve which is connected to the master cylinder and which is normally closed; and a dynamic hydraulic unit comprising a cylindrical bore in the actuator body housing a piston slidably sealed therein which separated the bore into first and second chambers, the first of which is connected to the said one part of the expansion chamber and, by means of a radial throttle passage to an axial passage formed within the piston and which communicates with the second chamber, and to a third chamber in the bore which is defined centrally by an annular groove in the position; the hydraulic actuator being controlled by a three-way two-position solenoid valve which normally connects the conduit for delivery of fluid from the said modulating valve with the said third chamber of the hydraulic unit and which, in the energised position, connects the said third chamber to a discharge conduit for the brake fluid.

The advantages of the present invention as defined above are that it provides an anti-skid actuator which has a smaller number of components than the known prior art and consequently is of reduced manufacturing complexity.

Moreover, in solution to the technical problems outlined above the hydraulic actuator of this invention has dynamic and static hydraulic circuits separated from one another.

Figure 2:
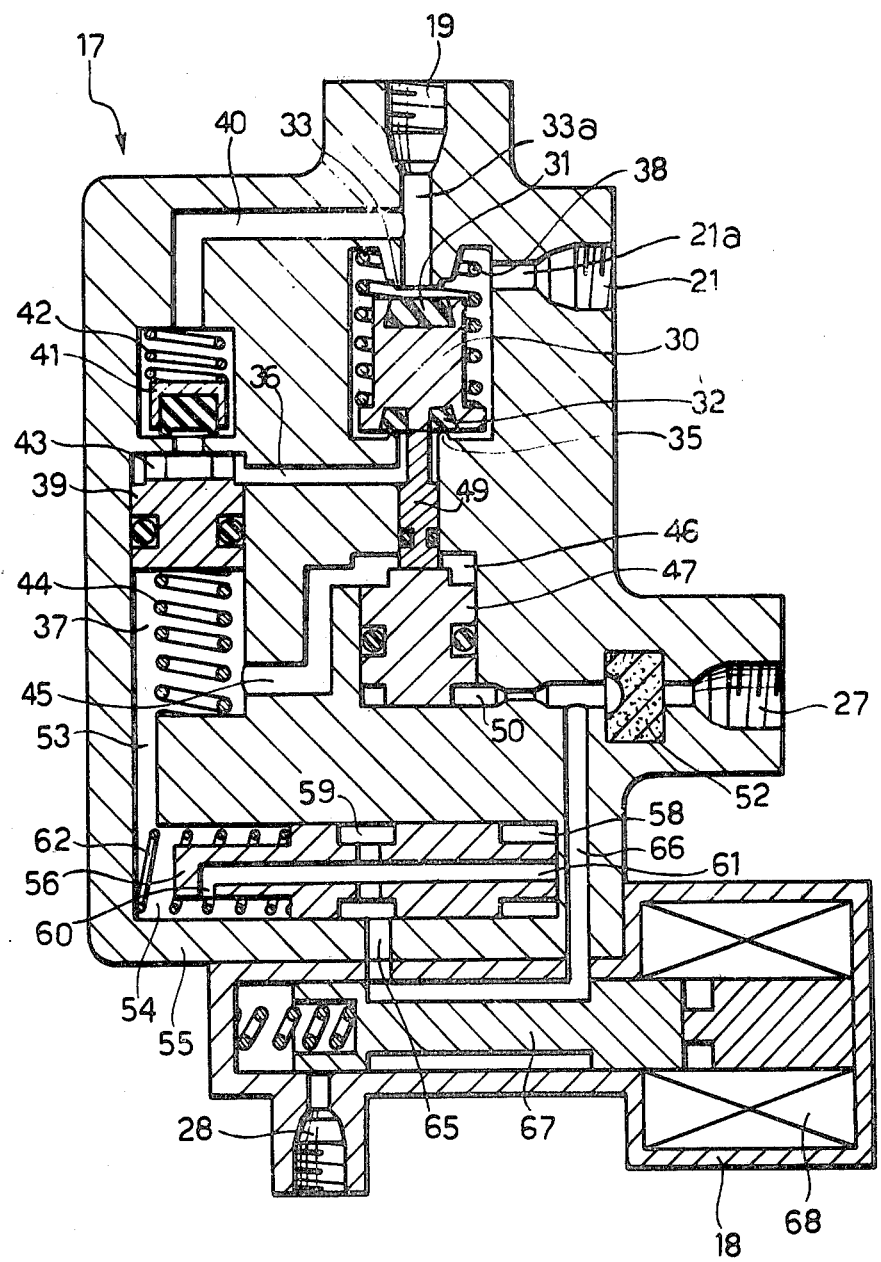

One embodiment of the present invention will now be more particularly described by way of example with reference to the accompanying drawings, in which:

FIG. 1 is a block diagram of a braking circuit for one axle of a motor vehicle; and, FIG. 2 is a schematic view, in cross-section of an actuator formed as an embodiment of the present invention.

Referring now to the drawings in FIG. 1 there is shown a master cylinder 3 which is operated by a pedal 5 and is connected to a conduit 7 which leads to a pressure modulating control valve 9 which is fed with fluid under pressure by a volumetric pump 12 which pumps fluid from a brake fluid reservoir 13 to the modulating control valve 9. From the modulating control valve 9 a discharge conduit leads to the brake fluid reservoir 13.

The hydraulic actuator 17 which is the subject of the invention, together with a solenoid valve 18, is connected by a conduit 19 to the conduit 7 leading from the master cylinder to the modulating control valve 9, and by a conduit 21 to the brake cylinders 23 of the wheels of one axle of the vehicle on which it is fitted.

Sensors 25 for sensing locking of the wheels are connected to an electronic circuit 26 which controls the solenoid valve 18 which is connected to a conduit 27 leading from the modulating control valve 9, and also to a discharge conduit 28 which leads into the brake fluid reservoir 13.

FIG. 2 is a cross-sectional view of the hydraulic actuator body 17, which will be described in relation to the orientation shown as an upright orientation although it will be appreciated that the body could in practice be located in any orientation. The body 17 includes a 3-way 2-position valve, formed by a cylindrical cavity in the actuator body 17, along with a piston 30 is slidable. The piston 30 has two end seals 31 and 32 of elastomeric material. The first end seal 31 abuts against an annular projection 33 through which passes a passage 33a to which the end of the condit 19 leading from the master cylinder is connected.

The conduit 21 which is connected to the brake cylinders is joined by a passage 21a in the body of the actuator 17 to the cavity in which lie the annular projection 33 and the piston 30.

The second end seal 32 abuts against the annular projection 35, located at the end of the cavity opposite to the passage 33a and forms the terminal part of a duct 36 which leads into the upper part of an expansion chamber 37. A spring 38 biases the piston 30 to press the second end seal 32 against the annular projection 35.

Within the expansion chamber 37 there is located a piston 39 slidingly sealed in the chamber by an intermediate sealing ring which divides the chamber 37 into upper and lower parts; the upper part of the chamber is connected to the conduit 19 via an internal duct 40, and a unidirectional valve 41 which is normally held closed by a spring 42 acting on the valve shutter piston 41. The upper part of chamber 37 is also provided with projections 43 against which the piston 39 rests, being biased to this position by a spring 44 which is located in the lower part of the expansion chamber 37.

This lower part of the expansion chamber is connected by an internal duct or passage 45 to the upper part 46 of a cylindrical chamber in which is located a double acting piston 47 which is sealed slidably in the bore by a sealing ring. The double acting piston 47 is connected to the piston 30 of the three-way two-position hydraulic valve by means of a shaft 49 which merely abuts at one end against the double acting piston 47 and which is sealed by a sealing ring intermediate its length. Part of its length is reduced in diameter and this part projects into the annular projection 35. The lower part 50 of the double acting piston chamber is connected to the conduit 27 via a filter 52.

The lower part of the expansion chamber 37 is also connected, this time by an internal duct 53, to the first chamber of a hydraulic system comprising a cylinder 55 having a piston 56 which is a sealed sliding fit therein, which piston separates the cylinder into a first chamber 54 at one end and a second chamber 58 at the other. A third annular chamber 59 is defined by a waist portion at the middle of the piston 56. The said first chamber 54 of the cylinder 55 is connected to the second and third chambers thereof by means of a radial throttle passage 60 and an axial conduit 61. The piston 56 is maintained in position by a calibrated spring 62 which urges it to the right against the right hand end wall (as viewed in FIG. 2).

A passage 65 leads from the said third, annular, chamber 59 to the solenoid valve 18, which is also connected to the conduit 27 leading from the modulating control valve 9 by an internal passage 66, and to the discharge conduit 28. A movable core 67 of the solenoid valve 18 is shaped in such a way as to put into communication the passages 65 and 66 when the solenoid 68 is energised, and to put into communication the conduits 65 and 28 when the solenoid 68 is de-energised.

The operation of the system described above, under normal braking conditions is as follows:

When no force is applied to the brake pedal 5 the volumetric pump 12 circulates brake fluid from the reservoir 13 through the open modulating control valve 9 and back to the reservoir without creating pressure in the circuit.

By applying force to the brake pedal 5, the pressure in the conduit 19 is caused to increase and this pressure, since the three-way hydraulic valve is open (as shown in FIG. 2) passes to conduit 21 and from there directly to the brake cylinders of the wheels 23. At the same time, the braking pressure in the conduit 17 also influences the pressure modulating control valve 9 by restricting the discharge 15 from the volumetric pump. This creates a pressure increase which, via the conduit 27, arrives at the lower part 50 of the chamber containing the double-acting piston 47, However, since the same pressure also arrives simultaneously at the upper part 46 of the chamber housing the double-acting piston 47, via the passage 66 into the solenoid valve 18, the passage 65, the annular chamber 59, the central passage 61, the radial throttle passage 60 the first chamber 54, the passage 53, the chamber 37, and the passage 45, and since the two sides of the piston 47 have the same area, the piston 47 is in a balanced state and consequently is not displaced.

Upon release of the brake pedal the fluid flows in the reverse direction through the same path.

The operation of the actuator under atni-skid braking conditions (and when the brakes are released) is as follows:

If, upon braking, an incipient skid state occurs then this is detected by the sensor 25 which passes a suitable signal to the electronic circuit. At the time when the sensor 25 sends the signal to the electronic circuit 26 to indicate that a wheel is in an incipient locking state, the pressure conditions inside the actuator 17 will be those which have just been described above for the case of normal operation. At this point the electronic circuit generates a signal which is fed to the solenoid 68 of the solenoid valve, the movable core 67 of which therefore moves in such a way that communication between the internal passage 65 and 66 is cut-off and the passage 65 is put into communication with the discharge conduit 28.

Because of this the pressure in the expansion chamber 37 falls and therefore consequently a decrease in pressure in the upper part 46 of the chamber in which piston 47 is located occurs. The piston 47 is thus no longer in a balanced state and moves upwardly. The shaft 49, against which the piston 47 abuts, also moves and causes the piston 30 to moe by the same displacement as the piston 47 until the end seal 31, by abutting against the annular projection 33, closes communication between the passages 21a and 33a and therefore the conduits 19 and 21, and consequently interrupts the delivery of fluid under pressure to the brake cylinders.

Displacement of the piston 30 also, however, causes simultaneous opening of communication between the passages 21a and the internal passage 36 so that the pressure in the brake cylinders at this time is partially discharged into the expansion chamber 37 causing the piston 39 to move downwardly at a velocity which is determined by the rate flow of brake fluid through the radial throttle passage 60 which formed in the piston 56. Consequently, the braking pressure reduces at the same rate up to the point where the weel re-acquires the road speed.

This occurrence is detected by the sensor 25, which passes a signal to the electronic circuit 26, which latter, by controlling the solenoid valve, causes the passages 65 and 66 to be again put into communication with one another and the discharge conduits to be cut off. It is assumed that braking pressure is still being applied along the conduit 19 by pressure being exerted on the brake pedal 5 so that upon reconnection of the passages 65 and 66 there first occurs a re-application of pressure in the passage 65 and, due to the throttle passage 60, an imbalance of pressure between the first chamber 54 and the second chamber 58, which causes the piston 56 to move, briskly to the left in FIG. 2, against the force of the calibrated spring 62.

Due to the volume of liquid which is thus introduced into the lower part of the expansion chamber 37, the piston 39 is caused to move sharply upwardly towards the projections 43 in such a way that the pressure in the brake cylinders increases quickly by a value which is directly related to the volume of the chamber 54; this latter can have dimensions which are selected upon manufacture according to the law governing the increase of pressure which it is required to achieve. At this point the velocity of the piston 39 and the resulting rate of increase of pressure at the brakes decreases considerably, due both to the presence of the throttle passage 60 and to the fact that, by selecting suitable dimensions for the chamber 59, the motion of the piston 56 causes simultaneous closure of communication between the transfer passage 65 and the annular chamber 59 defined by the mid region of the piston 56 so that consequently the delivery of pressure from the modulating control valve 9 along the conduit 27 is cut off.

The selected calibration of the spring 62 depends on the point in the operation cycle of the anti-skid device when braking is recommencing and a rapid increase in pressure at the brakes is desired. During this stage of the cycle of operation of the anti-skid device, communication between the passages 33a and 21a, and therefore between conduits 19 and 21, is still interrupted since the pressure in the lower part 50 of the chamber housing the double-acting piston 47 is still greater then the pressure which exists in the upper part 46 of this chamber.

Upon possible subsequent switching of the solenoid valve 18, the piston 56 is subjected to a pressure imbalance in the opposite sense, since the second chamber 58 is in communication with the discharge conduit 28, via the central passage 61, and this causes a brisk return of the piston 56 to its rest position, thus causing a decrease of pressure in the chamber 37, and consequently at the brakes, as a result of displacement of the piston 39 in expansion chamber 37. When the brake pedal 5 is eventually released, the pressure existing inside the actuator 17 can discharge by means of the unidirectional valve 41, there no longer being any pressure in the conduit 19.

What is claimed is:

1. In a motor vehicle hydraulic anti-skid braking system comprising:
    a master cylinder,
    a reservoir for brake fluid,
    a volumetric pump,
    a pressure modulating valve,
    sensors sesitive to the dynamic state of the wheels and operable to produce an output signal when an incipient skid state is detected,
    an electronic circuit for processing said signals,
    brake cylinders of the wheels and
    a hydraulic actuator controlled by said electronic circuit to vary the pressure in said braking circuit upon the generation of signals from said sensors,
    the improvement wherein said actuator comprises a three-way two-position hydraulic valve which is normally open at one end to connect a delivery conduit for brake fluid from said master cylinder to said brake cylinders,
    double-acting piston slidably sealed in a chamber in said actuator, which chamber it separates into two parts, one part of which is connected to a conduit for delivery of brake fluid from said pressure modulating valve;
    an expansion chamber separated into two parts by a piston slidably sealed therein, one part of said expansion chamber being connected to the other part of said chamber housing said double-acting piston, and the other part of said expansion chamber being connected by an internal passage to the other end of said three-way two-position hydraulic valve and to a unidirectional valve which is connected to said master cylinder and which is normally closed;
    a dynamic hydraulic unit comprising a cylindrical bore in said actuator body housing a piston slidably sealed therein, which piston separates the bore into first and second chambers, said first chamber being connected to the said one part of said expansion chamber and also, by means of a radial throttle passage to an axial passage, formed within the piston, which communicates with said second chamber and with a third chamber in the bore which is defined centrally by an annular groove in the piston; and
    a three-way two-position solenoid valve for controlling said hydraulic actuator, said solenoid valve normally connecting said conduit for delivery of fluid from said modulating control valve with said third chamber of said hydraulic unit and, in the energised position, commuting to connect said third chamber to a discharge conduit for said brake fluid.

2. The actuator of claim 1, wherein said third chamber defined by said piston of said hydraulic unit is positioned along this piston such that the discharge conduit is closed when said piston is displaced from its rest position.

3. The actuator of claim 1 or claim 2, wherein said piston of said hydraulic unit is urged towards its rest position by a calibrated spring.

4. The actuator of claim 3 wherein said spring which urges said piston of said hydraulic unit towards its rest position is located in said first chamber of said cylindrical bore.

5. The actuator of claim 1, including an electronic logic circuit controlling said solenoid valve.

* * * * *